April 29, 1952 — S. G. ESKIN ET AL — 2,594,750

THERMOSTATIC CONTROL DEVICE

Filed Feb. 23, 1949 — 2 SHEETS—SHEET 1

INVENTORS
Samuel G. Eskin and
BY Harold W. Rice.
Albert J. Henderson
THEIR ATTORNEY

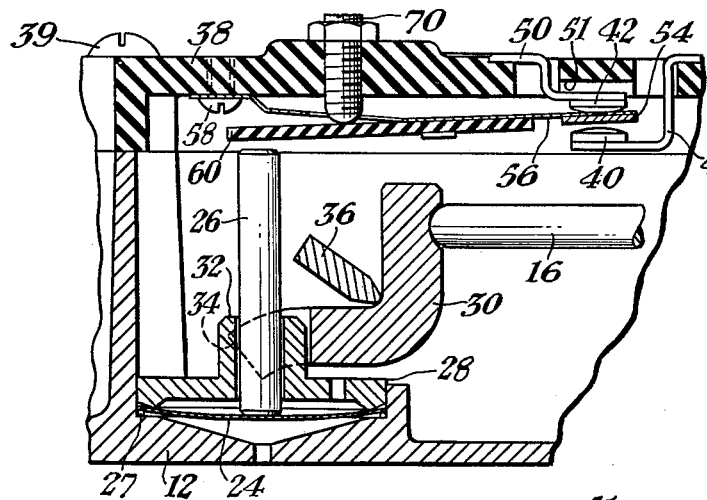
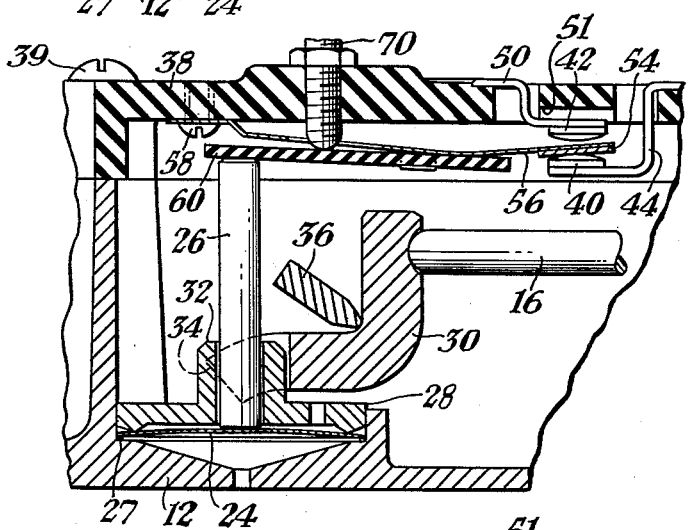
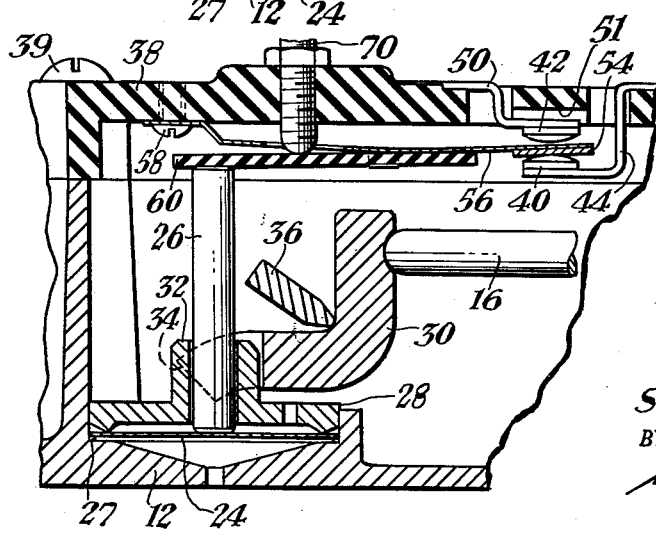

Patented Apr. 29, 1952

2,594,750

UNITED STATES PATENT OFFICE 2,594,750

THERMOSTATIC CONTROL DEVICE

Samuel G. Eskin and Harold W. Rice, Los Angeles, Calif., assignors to Robertshaw-Fulton Controls Company, Greensburg, Pa., a corporation of Delaware Application February 23, 1949, Serial No. 77,766

7 Claims. (Cl. 200—137)

1

This invention relates to thermostatic control devices and, more particularly, to surface type controls adapted to be clamped or otherwise secured to hot water tanks, pipes and other containers for responding to the temperature thereof.

An object of the invention is to reduce the number of parts required in such thermostats by utilizing the thermostat casing as a thermally responsive element.

Another object of the invention is to secure prompt and accurate response to temperature changes occurring at the surface of the tank or pipe.

Another object of the invention is to otherwise simplify the construction and render the same rugged and easily applicable to the tank or pipe.

Another object of the invention is to facilitate adjustment of the thermostat during manufacture and enclose the working parts against tampering or damage after final installation.

Other objects and advantages will become apparent from the following description taken in connection with the accompanying drawings wherein.

Figure 1:
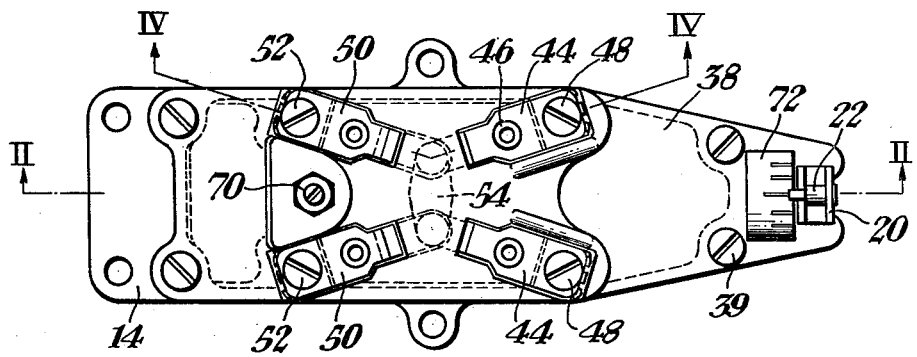
Fig. 1 is a plan view of the improved thermostatic control device.
Figure 2:
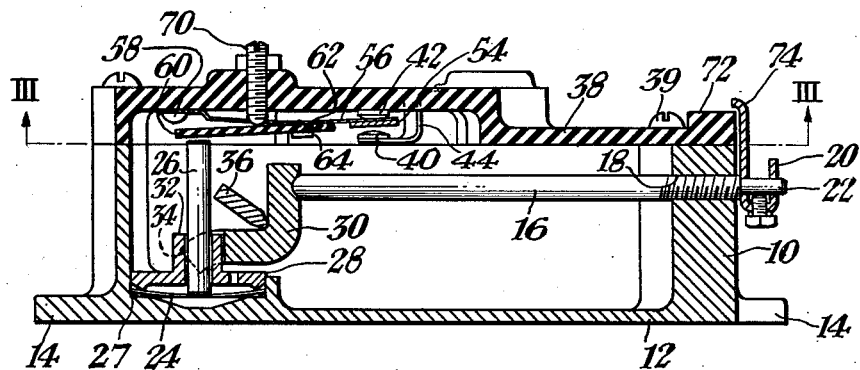
Fig. 2 is a longitudinal section taken on the line II—II of Fig. 1.
Figure 3:
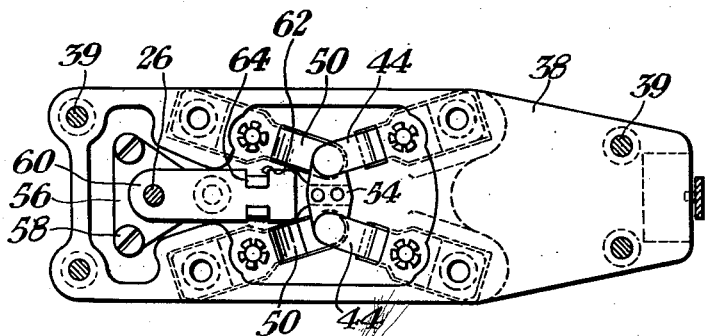
Fig. 3 is a section taken on the line III—III of Fig. 2.
Figure 4:
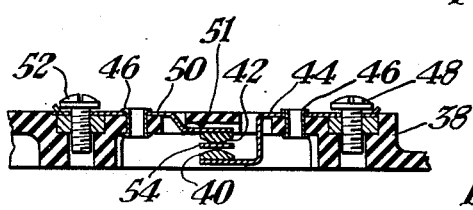
Fig. 4 is a partial section taken on the line IV—IV of Fig. 1.

Figs. 5–7 inclusive are partial sectional views on an enlarged scale corresponding largely to Fig. 2 and showing the operating parts in different operative positions.

Referring more particularly to the drawing, the thermal element casing 10 is made of material having a relatively high coefficient of expansion, such as aluminum. The casing 10 is of box-like form having a bottom wall 12 either flat or curved to fit the surface of a tank or pipe through which the hot water or other heated fluid is adapted to flow. The bottom wall 12 is provided at the opposite ends thereof with lugs 14 suitably perforated for the reception of attaching screws (not shown) by means of which the casing 10 may be secured in good heat conducting contact with the surface of the pipe or tank. However, it will be apparent that other means of attaching or clamping the casing to the tank surface may be provided if desired.

The other thermal element of the control device takes the form of an elongated member or rod 16 of material having a relatively low coefficient of expansion such as invar, porcelain or silica. The rod 16 is threaded adjacent one end for mounting in a suitably tapped hole 18 formed in one end wall of the casing 10. The free end of the rod 16 projects adjacent the opposite end of the casing 10 and may be adjusted relatively thereto by reciprocation of the rod 16 upon operation of a manually operable lever 20 which is secured to an exterior projection 22 on the threaded end of the rod 16.

Snap-action means are positioned in the casing 10 adjacent the free end of the rod 16 and take the form of the usual clicker disk 24 having an operating element or stem 26. The disk 24 is supported on its outer edge on a ring 27 and a thrust element 28 engages the opposite side of the disk 24 in the usual manner. The operating stem 26 projects through the element 28 on an axis generally normal to the rod 16 and extends beyond the free end thereof. A bell-crank lever 30 serves to transmit motion from the rod 16 to the thrust element 28 and has one free end suitably recessed for engagement with the free end of the rod 16 for this purpose. It is not essential that the rod 16 extend, as shown, perpendicular to the arm of the lever 30 which it engages or to the operating stem 26 as this relationship could well be angular. Consequently, it is defined herein as generally normal by which term such alternatives are intended to be included. The opposite end of the lever 30 is suitably recessed for the reception of an upstanding collar 32 formed on the thrust element 28. The oppositely disposed sides of the lever 30 so formed are bent downwardly and provided with V-shaped ends 34 for linear engagement with the thrust element 28. A fulcrum bar 36 projects transversely of the lever 30 and is supported at either end thereof in the opposite sides of the casing 10. The bar 36 projects within the angle formed by the arms of the lever 30 and provides a fulcrum for pivotal movement of the lever 30.

As shown more clearly in Figs. 5 and 6, the disc 24 flexes between concave and convex form to cause operation of the stem 26. The reversal of contour occurs with the snap-action associated with devices of this nature. The parts are shown in Fig. 5 with the disc 24 in its concave form which occurs when the casing 10 is unheated and the thrust element 28 applies sufficient force to the disc 24 for this purpose. When this force is relieved by heating of the casing 10 then the parts assume the position shown in Fig. 6 with the disc 24 in its convex form. Fig. 7 illustrates a mean position of the disc 24 as it is about to snap over center as hereinafter more fully described.

The casing 10 is provided with a cover member 38 of insulating material and which may be secured in position by screws 39. The cover 38 carries the control means to be operated by the snap action means which, as described, are housed within the casing 10. In this embodiment, the control means takes the form of electric switch means comprising a lower pair of fixed contacts 40 having, positioned in spaced overlying relationship therewith, an upper pair of fixed contacts 42. The contact pair 40 is carried on a pair of terminals 44 which project through the cover member 38 to the exterior thereof and are positioned in angular relationship on the right-hand side of the cover 38 as viewed in the drawing. The terminals may be identical in all respects and are secured individually by rivets 46 to the cover 38. Each terminal of the pair 44 carries a terminal screw 48 for connection to conductors such as those of a secondary element to be controlled by another thermostatic control device (not shown). The upper contacts 42 are also carried on a pair of terminals 50 which may be identical with each other in all respects. The terminals 50 are positioned in similar angular relationship to those associated with the lower contacts 40 but project into individual recesses 51 in the underside of the cover 38 and on the left of terminals 44 as viewed in the drawing. The terminal screws 52 associated with these left-hand terminals 50 may be connected to a heating element which would be under control of the thermostatic device of this invention. It will be understood that a single pole switching means may be employed and other circuit arrangements alternated herewith as the present embodiment is exemplary only.

The circuit through either of the contact pairs 40 or 42 is completed by the provision of a contact bridge 54 which extends between the contact pairs 40, 42 and is normally biased into engagement with the contact pair 42. The contact bridge 54 is riveted or otherwise secured to the free end of a flat spring element 56 which extends adjacent the underside of the cover 38 and is secured thereto at the opposite end by screws 58. The spring element 56 is operative under its bias to move the contact bridge 54 into engagement with the contact pair 42, that is, the bias is counterclockwise as viewed in the drawings. A contact arm 60 of insulating material is interposed between the spring element 56 and the operating element 26 of the snap action means. The contact arm 60 is secured to the spring element 56 by the provision of oppositely disposed notched portions 62 thereon for the reception of a pair of clip elements 64 formed on the spring element 56 intermediate the ends thereof.

A pivotal mounting for the switch operating means is provided by an adjustable fulcrum screw 70 which extends from the exterior of the cover 38 through a clearance opening in the spring element 56 and engages with the contact arm 60 intermediate the operating element 26 and the notched end 62. As will be apparent, adjustment of the screw 70 inwardly will serve to move the contact bridge 54 toward the lower contact pair 40 by overcoming the normal bias of the spring element 56. The structure is completed by the provision of a raised portion 72 carrying temperature graduations which is formed on the cover 38 for cooperation with a pointer 74 carried on the end of the adjusting lever 20.

In the operation of the device, if the temperature of the casing 10 falls due to cooling of the fluid in the tank or pipe, then the housing 10 will contract while the rod 16 remains substantially constant in length. Consequently, the rod 16 may be considered to apply a force toward the left on the associated arm of the lever 30 as viewed in the drawings. This force will be transferred by the lever 30 as a downward force on the thrust element 28 causing the clicker disk 24 to snap over center and assume its concave contour shown in the drawings, Figs. 2 and 5. Consequently, the end of the spring element 56 carrying the contact bridge 54 will move counterclockwise under its bias as described to disengage the contact pair 40 and engage the contact pair 42. The heating circuit through the terminals 50 is now completed and the rising temperature of the tank is transmitted to the housing 10 by conduction from the bottom wall 14.

As the temperature affecting the housing 10 increases, a reverse operation of the control device occurs since the clicker disk 24 snaps over center and assumes the convex contour shown in Fig. 6 of the drawings. In such condition, the contact bridge 54 is moved clockwise by the pivotal movement of the arm 60 about the screw 70 under the force exerted by the stem 26 until engagement with the contact pair 40 occurs. It will be understood that the motion of the clicker disc will be slightly greater than that required to cause engagement of the contact bridge 54 with contacts 40 and this additional movement is taken up by the flexibility of the spring element 56. Should welding of the contact bridge 54 with contacts 40 occur, the full force of the disc 24 is available to break the undesirable union. During the cycle of operation, the parts transitorily assume the positions shown in Fig. 7 wherein the effect of decreasing temperature is illustrated. Thus, the force of the rod 16 under contraction of the casing 10 has caused the clicker disc 24 to nearly reach its snap point. The contact arm 60 has been rotated by the stem 26 to some extent in a counterclockwise direction during this movement of the disc 24 from convex (Fig. 6) to concave (Fig. 5). However, the contact bridge 54 still engages the contacts 40 due to the spring element 56 being unable at this juncture to exert its bias. Assuming the temperature drop continues to affect the device then the automatic reversal of the contour of the disc 24 occurs and the parts assume the positions shown in Fig. 5. This automatic reversal of the contour of the clicker disk 24 for operating the contact arm 60 will continue as long as the temperature affecting the housing 10 continues to vary. Adjustment of the temperature at which the device will operate can readily be made by movement of the lever 20 attached to the rod 16 to locate the pointer at any desired graduation on the raised portion 72.

It will be apparent that calibration of the device can readily be effected at the point of use due to the simple nature of the construction employed. Moreover, if the temperature gradient between the device and the fluid to be thermostatically controlled is known, such adjustment can be made by the manufacturer. During manufacture, adjustment of the contact gap and position of the fulcrum screw 70 for optimum conditions can readily be made, however, leaving only temperature calibration to be effected in the field.

It will be understood that many changes may be made in the details of construction and arrangement of parts without departure from the scope of the invention as set forth in the appended claims.

We claim:

1. A thermostatic control device comprising a box-like thermal element having a bottom adapted to be secured to a heat transferring surface and sides disposed substantially normal to said bottom, an elongated member secured at one end to one of said sides and extending into said box-like thermal element substantially parallel to said bottom, said member having a coefficient of expansion different from that of said element, snap action means positioned within said box-like thermal element adjacent the other end of said member and having a reciprocable operating element, connection means between said snap action means and said other end of said member for actuating said snap action means upon movement of said other end relative to said snap action means, and control means operatively engageable by said operating element.

2. A thermostatic control device as claimed in claim 1 wherein adjusting means operable exteriorly of said box-like thermal element is provided for adjusting the position of said elongated member relative to said thermal element.

3. A thermostatic control device comprising a box-like thermal element having a bottom adapted to be secured to a heat transferring surface and sides disposed substantially normal to said bottom, an elongated member secured at one end to one of said sides and extending into said box-like thermal element substantially parallel to said bottom, said member having a coefficient of expansion different from that of said element, snap action means positioned within said box-like thermal element adjacent the other end of said member and having a reciprocable operating element, connection means between said snap action means and said other end of said member for actuating said snap action means upon movement of said other end relative to said snap action means, a cover for said box-like thermal element, and control means carried by said cover to be operatively engageable by said operating element.

4. A thermostatic control device comprising a box-like thermal element having a bottom adapted to be secured to a heat transferring surface and sides disposed substantially normal to said bottom, an elongated member having one end threaded into one of said sides and the other end extending into said box-like thermal element substantially parallel to said bottom, said member having a coefficient of expansion different from that of said element, adjusting means operable exteriorly of said box-like thermal element for rotating said elongated member relative to said thermal element, snap action means positioned within said thermal element adjacent the other end of said member and having a reciprocable operating element, connection means between said snap action means and said other end of said member for actuating said snap action means upon movement of said other end relative to said snap action means, and control means operatively engageable by said operating element.

5. A thermostatic control device as claimed in claim 4 wherein said thermal element supports a cover member arranged to close the open end thereof, said control means being mounted on said cover member.

6. A thermostatic control device comprising a thermal element casing adapted to be secured to a heat transferring surface and to respond to conduction from said surface, an elongated member mounted at one end for reciprocation in said casing and having a free end extending adjacent an opposite end of said casing, said member having a coefficient of expansion different from that of said casing, snap action means positioned in said casing beyond the free end of said elongated member and having an operating element reciprocable on an axis generally normal to said elongated member and beyond said free end thereof, a bell crank lever having its free end operatively engaging said snap action means and the free end of said elongated member, means carried by said casing for pivotal mounting of said lever to transmit movement to said operating element, means operable exteriorly of said casing for adjusting said elongated member therein, a cover member for said casing, switch means mounted on said cover member, and switch operating means pivotally mounted on said cover for operative engagement by said operating element for controlling said switch means.

7. A thermostatic control device comprising a thermal element casing adapted to be secured to a heat transferring surface and to respond to conduction from said surface, an elongated member within said casing having one end threaded into one wall of said casing and a free end extending adjacent the opposite end of said casing, said member having a coefficient of expansion different from that of said casing, snap action means positioned in said casing beyond the free end of said elongated member and having an operating element reciprocable on an axis generally normal to said elongated member and beyond said free end thereof, a bell crank lever having its free ends operatively engaging said snap action means and the free end of said elongated member, means carried by said casing for pivotal mounting of said lever to transmit movement to said operating element, means operable exteriorly of said casing for rotating said elongated member relative to said casing, a cover member for said casing, switch means mounted on said cover member, and switch operating means pivotally mounted on said cover for operative engagement by said operating element for controlling said switch means.

SAMUEL G. ESKIN.
HAROLD W. RICE.

REFERENCES CITED

The following references are of record in the file of this patent:

UNITED STATES PATENTS

| Number | Name | Date |
| --- | --- | --- |
| 1,366,286 | Sahlin | Jan. 18, 1921 |
| 1,939,285 | Spencer | Dec. 12, 1933 |
| 1,940,300 | Gerdien et al. | Dec. 19, 1933 |